United States Patent [19]

Fujii et al.

[11] Patent Number: 5,137,667
[45] Date of Patent: Aug. 11, 1992

[54] PROCESS FOR PRODUCING ELASTIC GRAPHITE MOLDED PRODUCTS

[75] Inventors: Masaki Fujii, Sakai; Masanori Minohata, Izumi, both of Japan

[73] Assignee: Koa Oil Company, Ltd., Tokyo, Japan

[21] Appl. No.: 752,553

[22] Filed: Sep. 10, 1991

[51] Int. Cl.$^5$ ................... B29C 67/24; C01B 31/00
[52] U.S. Cl. ................................ 264/109; 264/104
[58] Field of Search ........................... 264/109, 104

[56] References Cited

U.S. PATENT DOCUMENTS

| | | | |
|---|---|---|---|
| 4,758,473 | 7/1988 | Herscovici et al. | 428/408 |
| 4,908,200 | 3/1990 | Fujii et al. | 423/448 |
| 5,017,358 | 5/1991 | Yamada et al. | 423/449 |
| 5,057,297 | 10/1991 | Fujii et al. | 423/448 |

Primary Examiner—Mary Lynn Theisen
Attorney, Agent, or Firm—Wenderoth, Lind & Ponack

[57] ABSTRACT

A process for producing an elastic graphite molded product having light weight and excellent elasticity which comprises the steps of mixing elastic graphite particles as fillers with a binder resin, thereby to adhere the binder resin to the surface of the elastic graphite particles as in the form of a spider web, and thereafter molding the thus obtained mixture.

5 Claims, 1 Drawing Sheet

10μm

ND PRODUCTS

TECHNICAL FIELD

This invention relates to a process for molding a carbonaceous material and, more particularly, to a process for producing an elastic graphite molded product having light weight and excellent elasticity.

BACKGROUND ART

In general, molded products containing a carbonaceous material as an a filler have been produced by adding a binder to a carbonaceous powder such as graphite or coke, kneading them, molding the knead, curing it, optionally firing, and graphitizing the cured product. Required characteristics vary depending upon the purpose or use of the produced carbonaceous molded products, and therefore the molded products have been produced by using many molding processes and many binders. Many reports and proposals therefor are found in literatures. (e.g., "Revised Introduction to Carbon Material", p. 135, Carbon Material Association; Mizushima and Okada, "Carbon Material" p. 55, Kyoritsu Shuppan; Ishikawa and Nagaoki, "New Carbon Engineering", p. 173, Kindai Hensyusha)

These conventional carbonaceous molded products have characteristics inherent to carbonaceous materials, i.e., light weight, high strength, high young's modulus, conduction property, corrosion resistance, heat resistance and sliding property. While such carbonaceous molded products having high young modulus are advantageous when rigidity is required, they lack flexibility because they have no yield point. From the standpoint of safety faster, carbonaceous molded products having much higher strength have been required.

We have proposed an elastic graphite structure having excellent elasticity characteristics as carbonaceous materials (Japanese Patent Application No. 164808/1987). This elastic graphite structure per se is of light weight and exhibits good elasticity. The elastic graphite structure has excellent characteristics which could not be obtained by the conventional carbonaceous materials.

However, in the conventional molding technique, it is not necessarily easy to mold the carbonaceous materials into a specific molded product in such a state that characteristics inherent to starting carbonaceous materials are utilized, even if the carbonaceous materials per se have good material characteristics. Molding processes conformed to material characteristics have not established yet so far.

DISCLOSURE OF INVENTION

The present invention has been accomplished in view of the foregoing. An object of the present invention is to provide a process for producing an elastic molded product having light weight and excellent compressive elasticity.

In order to achieve the object described above, a process for producing an elastic graphite molded product according to the present invention comprises the steps of mixing elastic graphite particles as fillers with a binder resin, thereby to adhere the binder resin to the surface of the elastic graphite particles as in the form of a spider web, and thereafter molding the mixture.

BEST MODE FOR CARRYING OUT THE INVENTION

Figure 1:
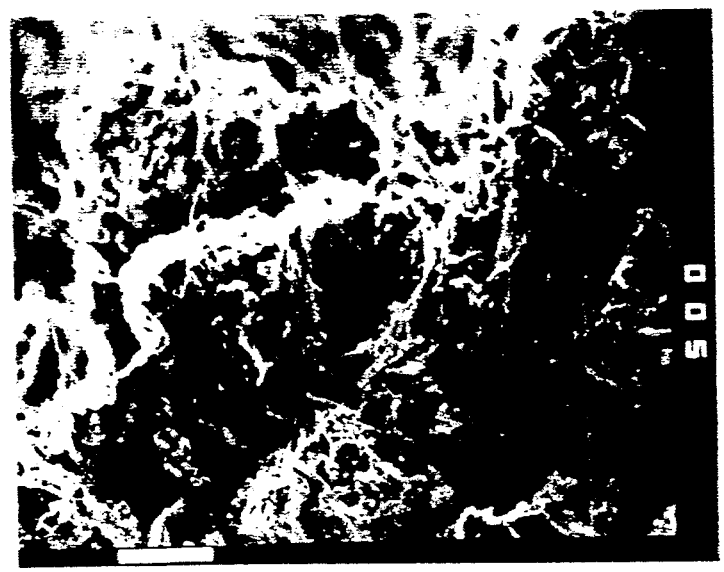
FIG. 1 is a microphotograph showing the structure of a texture of an elastic graphite molded product obtained by Example 1 of the present invention.

The feature of the present invention resides in a process for molding elastic graphite particles without impairing their elasticity. The outline of the present process is described hereinafter.

Elastic graphite structure for use herein as the starting material include those known in the art. Particularly preferred elastic graphite structures which can be used include those obtained by treating carbonaceous mesophases prepared by heat treatment of pitches such as petroleum pitches and coal pitches and/or green coke with nitric acid or a mixture of nitric and sulfuric acids, heat treating the treated mass and graphitizing the same; and those obtained by treating the carbonaceous mesophares and/or green coke with nitric acid or a mixture of nitric and sulfuric acids, contacting the treated mass with a basic aqueous solution to solubilize it, adding an acid solution to precipitate the carbonaceous component, heat treating the carbonaceous component and graphitizing it. Details of a process for producing such graphite structures having excellent elasticity characteristic are described in, for example, Japanese Patent Application No. 164808/1987.

In the present invention, particulates of the elastic graphite structures as described above are used as the starting materials. It is preferred that the particle size of graphite particles of the order of 10 $\mu$m to 1 mm from the standpoint of moldability.

The resin used as a binder in the present invention is preferably a dispersed resin wherein thermosetting resin or thermoplastic resin is dispersed in a suitable dispersion medium. The reasons why the dispersed resin is used are as follows.

Heretofore, in the production of molded products such as carbon products, binders such as coal tar pitches, phenol resins and furan resins have been used. These melt at about 100° C., and the molten binders are kneaded with a filler, and the knead is cured, molded, fired and/or graphitized to obtain a molded product.

The inner bulkhead of the elastic graphite particles described above has a spongy microstructure divided by thin carbon walls. It is thought that this is because characteristics such as light weight and excellent compressive elasticity are developed. Accordingly, in the molded products produced by a molding process using the prior art binder, molten binder penetrates into the interior of the elastic graphite particles to impair the elasticity of the elastic graphite structure. We have carried out studies while paying attention to the drawbacks described above. We have now found that the use of a dispersed resin as a binder causes the bonding of particles in such a state that the resin surrounds the elastic graphite particles and therefore resin dues not penetrate into the interior of a spongy structure of the elastic graphite particles whereby a good molded product can be obtained without impairing structure and elastic characteristic.

It has turned out that, according to our finding, the dispersed resin having a low viscosity is dispersed in the dispersion medium in the form of spheres and therefore the resin is stretched in the form of a yarn by mixing and kneading such a resin with the elastic graphite particle filler, whereby there is developed such a state the resin adheres to and entangles with the surrounding of the elastic graphite particles in the form of a spider web. Because the binder resin adhered to and entangled with the elastic graphite particles in the form of a yarn or spider web acts as a binder by adhering so that the binder resin covers onto only the surface of the graphite particles without penetrating into the interior of the spongy structure of the graphite particles, elastic characteristic inherent to the elastic graphite particles per se as the fillers is not reduced.

The resins which constitute the dispersed resins as the binder as described above can be suitably selected depending upon the type of desired molded products. Particularly preferred resins are tetrafluoroethylene resins, epoxy resins, phenols resins, unsaturated polyester resins in that they improve molding characteristic.

Materials such as water, alcohols and inorganic acids are preferably used as the dispersion medium.

In the present invention, a desirable binder is one obtained by adding from 0.1 to 4.0 parts by weight, preferably from 0.2 to 1.5 parts by weight of the resin to 1 part by weight of the dispersion medium described above.

In the present invention, a dispersed resin solution is added to and thoroughly mixed with the elastic graphite particle described above so that the amount of the resin is from 0.1 to 4.5 parts by weight, particularly preferably from 0.5 to 4.5 parts by weight based on 1 part by weight of the elastic graphite particle. If the amount of the resin exceeds 4.5 parts by weight based on 1 part by weight of the elastic graphite particle, the bulk density of the resulting molded product tends to be increased and thus such an amount is undesirable.

In the mixing step, an appropriate amount of water can be added so that the mixture becomes highly viscous just like a rice cake. Water may be previously added to the binder resin solution.

When the amount of the binder excessively large to prepare a muddy mixture, moisture can be suitably removed by drying after mixing.

In the present invention, there can be utilized a mixing method wherein shear stress is applied in the mixing step. The development of such a microstructure that the binder resin described above surrounds the graphite particles can be much accelerated by carrying out this shear mixing. While such a mixing step can be carried out by means of various apparatuses such as static mixers, and Henschel mixers, pulverizers such as ball mills and kneaders can be used.

In the present invention, the rice cake-like mixture obtained by mixing or kneading as described above is charged into a specific mold as such. Alternatively, the rice cake-like mixture is dried and the resulting powder is charged into a specific mold. The mixture is molded by conventional methods such as pressure molding. After molding, the curing of the binder resin may be carried out by heating or the like.

The molded products thus obtained have light weight and excellent elasticity which cannot be obtained conventional carbonaceous molded products. Of other properties inherent to the carbonaceous materials, properties such as heat resistance and corrosion resistance are influenced by the properties of the binder resin and therefore these properties are inferior to those of the carbon products. However, properties such as electroconductivity and sliding property are maintained because the elastic graphite particle and the resin are uniformly mixed.

The present invention is illustrated in more detail by Examples.

EXAMPLE 1

Green coke obtained by delayed coking process was pulverized to an average particle size of 10 μm. The elemental composition of the green coke was 95.1 wt% of carbon, 3.1 wt% of hydrogen and 0.6 wt% of nitrogen. Five grams of the green coke was added in small portions to 100 ml of a mixed acid consisting 96% concentrated sulfuric acid and 70% concentrated nitric acid in a volumetric ratio of 50:50 in a Erlenmeyer flask of 300 ml in volume. After the total amount of the green coke had been added, the flask was heated for 4 hours in an oil bath previously heated to 80° C. Then, the product was filtered out through a glass filter (No. 4), sufficiently washed with water, and dried. The yield was 140% by weight. The product was dispersed in water, and 2.5 N-NaOH was added with stirring until the pH was 10. The dispersion was then filtered through a glass filter (No. 4) and 1 N.HNO$_3$ was added to the filtrate until the pH value was below 1 (the precipitate is hereinafter referred to as an aquamesophase). The aquamesophase was filtered through a glass filter (No. 4) and dried. The yield of the aquamesophase was 133% by weight based on the green coke. This aquamesophase was placed in a cylindrical glass vessel of 500 ml, and then it was in turn held for 30 minutes in a salt bath previously heated to 300° C. Next, the product was heated to 2,800° C. at a heating rate of 400° C./hr in an argon gas flow and then held at that temperature for 30 minutes for graphitization. The yields were 85 and 52% by weight based on the green coke, respectively.

The compressive elasticity (compressibility and recovery ratio) of the graphitized sample (the elastic graphite structure) was measured in the following manner.

In a cylindrical vessel of 10 mm inner diameter was charged with 0.5 g of the sample pulverized to no more than 0.33 mm on which a load of 1 kg/cm$^2$ was applied from above. The sample's volume at this point was used as the base volume ($h_0$). Then, a predetermined load was applied and the volume was measured. This volume was designated as $h_1$. Then, the load was removed and the volume $h_2$ was measured. The compressibility and recovery ratio were calculated by the following equations:

Compressibility (%) = $\{(h_0-h_1)/h_0\} \times 100$

Recovery ratio (%) = $\{(h_2-h_1)/(h_0-h_1)\} \times 100$.

Furthermore, the packing density was calculated from $h_0$ according to the following formula;

Packing density (g/cm$^3$) = sample weight ÷ $h_0$.

The results are shown in Table 1.

TABLE 1

| Elastic Graphite Structure | Packing Density (1 kg/cm$^2$) [g/cm$^3$] | Load [kg/cm$^2$] | Compressibility [%] | Recovery Ratio [%] |
| --- | --- | --- | --- | --- |
| | 0.23 | | | |
| | | 500 | 84 | 88 |
| | | 5000 | 91 | 84 |

One gram of a tetrafluoroethylene resin (manufactured by Mitsui/Dupont Fluorochemical, K,K. under the trade name 30 - J; resin content of 60% by weight) and 2 grams of water were added to 1 gram of the elastic graphite structure pulverized to no more than 45 μm, and the whole was well mixed by a glass rod. When the whole became highly viscous just like a rice cake, it was transferred to a 25×50 mm mold and pressure molded under a pressure of 40 kg/cm$^2$. It was held for 30 minutes at 100°–120° C., and moisture was evaporated. Thereafter, treatment was carried out for one hour at 350° C. to cure to obtain a molded product. The dimension of this molded product was 25×50×3 mm. The compressive elasticity of the molded product was measured. Experiments were carried out by varying the composition of the elastic graphite structure, resin and water. The results (No. 1-8) are shown in Table 2.

FIG. 1 is a microphotograph of a texture of the molded product obtained. As can be seen from FIG. 1, the binder resin entangles with the surface of the graphite particles in the form of a yarn or spider web.

EXAMPLE 2

One gram of the same elastic graphite structure as used in Example 1 and 3 grams of the same resin as used in Example 1 were placed in a beaker and well mixed by a glass rod. The mixture was placed in a drier at 100°–120° C. for 2 hours, dried and thereafter pressure molded 120° C. for 2 hours, dried and thereafter pressure molded under a pressure of 40 kg/cm$^2$. This was treated for one hour at 350° C. to cure to obtain a molded product. The dimension of this molded product was 25×50×3 mm. The compressive elasticity of the resulting molded product was measured. The results (No. 9) are shown in Table 2.

No. 10 is an experimental example wherein only the resin was molded.

COMPARATIVE EXAMPLE

One gram of the same elastic graphite structure as used in Example 1 and 3 grams of the same resin as used in Example 1 were placed in a beaker, transferred to a mold without any mixing step and pressure molded under a pressure of 40 kg/cm$^2$. The treated material was treated for one hour at 350° C. to cure it to obtain a molded product (No. 11). The dimension of the molded product was 25×50×3 mm, and its bulk density was 1.07 g/cm$^3$. However, many cracks occurred in portions of the surface of the molded product.

Figure 2:
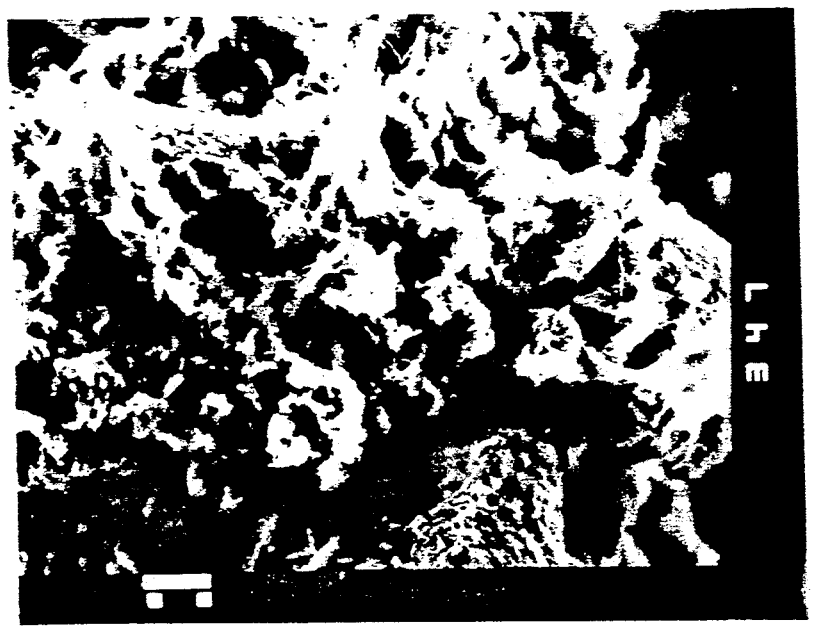
FIG. 2 is a microphotograph showing the structure of a texture of a molded product obtained by Comparative Example.

FIG. 2 is a microphotograph of a texture of the resulting molded product. It turned out that the binder resin was unevenly dispersed in the surface of the graphite particles in the form of a lump.

TABLE 2

| | Composition, Weight Ratio | | | Bulk Density | Amount of filler | Load 100 kg/cm$^2$ | | Load 350 kg/cm$^2$ | |
| --- | --- | --- | --- | --- | --- | --- | --- | --- | --- |
| No. | filler | Resin | Water | g/cm$^3$ | wt % | Compressibility (%) | Recovery Ratio (%) | Compressibility (%) | Recovery Ratio (%) |
| 1 | 1 | 0.25 | 3.5 | 0.34 | 87 | (crack) | | — | — |
| 2 | 1 | 0.50 | 3 | 0.40 | 77 | (crack) | | — | — |
| 3 | 1 | 1 | 2 | 0.47 | 63 | | | 62 | 54 |
| 4 | 1 | 3 | 2 | 0.81 | 36 | 17 | 70 | 48 | 65 |
| 5 | 1 | 4 | 1 | 0.97 | 29 | | | 41 | 64 |
| 6 | 1 | 5 | 0 | 1.16 | 25 | | | 31 | 56 |
| 7 | 1 | 6 | 0 | 1.30 | 22 | | | 29 | 61 |
| 8 | 1 | 8 | 0 | 1.58 | 17 | | | 22 | 61 |
| 9 | 1 | 3 | 0 | 0.77 | 36 | — | — | 52 | 54 |
| 10 | 0 | 100 | 0 | 2.13 | 0 | | | 17 | 45 |
| 11 | 1 | 4 | 0 | 1.07 | 29 | (crack) | | | |

As can be seen from the results of Examples described above, according to the present invention, molding can be carried out while utilizing elastic characteristic inherent to the graphite structure which is a molding material. Accordingly, elastic graphite molded products having light weight and excellent elasticity can be obtained.

INDUSTRIAL APPLICABILITY

The elastic graphite molded products obtained by the present invention have characteristics such as electroconductivity and sliding property inherent to graphite materials; microporous structure which cannot be obtained in the prior art; and excellent compressive elasticity. Accordingly, the elastic graphite molded products can be utilized in many uses utilizing these features, such as gaskets, packings, shock resistance-improving materials, brake shoes, friction boards, wave-absorbing materials, catalyst carriers, and heat insulating materials.

We claim:

1. A process for producing an elastic graphite molded product having light weight and excellent elasticity, comprising the steps of:
   mixing elastic graphite particles as fillers with a binder resin, thereby to adhere the binder resin to the surface of the elastic graphite particles as in the form of a spider web; and
   molding the thus obtained mixture.

2. The process according to claim 1, which includes a step of curing the binder resin after molding.

3. The process according to claim 1, wherein the binder resin comprises a dispersed resin in which a resin is dispersed in a dispersion medium.

4. The process according to claim 1, wherein said mixing step is carried out by shear mixing.

5. The process according to claim 1, wherein water is added in the mixing step.